United States Patent
Llanos et al.

(12)

(10) Patent No.: US 6,624,997 B1
(45) Date of Patent: Sep. 23, 2003

(54) ELECTRICAL POWER CONDITIONER

(75) Inventors: Reynaldo P. Llanos, Escondido, CA (US); Victor Soto, Valley Center, CA (US); Randall J. Redding, Buckley, WA (US)

(73) Assignee: Teal Electronics Corporation, San Diego, CA (US)

(*) Notice: Subject to any disclaimer, the term of this patent is extended or adjusted under 35 U.S.C. 154(b) by 327 days.

(21) Appl. No.: 09/632,547

(22) Filed: Aug. 4, 2000

(51) Int. Cl.⁷ .............................. H02H 3/22; H02M 1/14
(52) U.S. Cl. ......................... 361/111; 307/105
(58) Field of Search .................... 361/111, 118, 361/127; 307/105

(56) References Cited

U.S. PATENT DOCUMENTS

| | | | |
|---|---|---|---|
| 3,711,760 A | * | 1/1973 | Kaiser .......................... 321/5 |
| 3,882,369 A | * | 5/1975 | McMurray .................... 321/6 |
| 4,095,163 A | * | 6/1978 | Montague ..................... 323/8 |
| 4,156,838 A |   | 5/1979 | Montague |
| 4,771,356 A | * | 9/1988 | Hastings ....................... 361/59 |
| 4,802,055 A |   | 1/1989 | Beckerman |
| 5,012,382 A | * | 4/1991 | Carpenter et al. ........... 361/93 |
| 5,038,245 A |   | 8/1991 | Gronskog |
| 5,388,021 A | * | 2/1995 | Stahl ............................ 361/56 |
| 5,535,087 A | * | 7/1996 | Puckett et al. .............. 361/118 |

OTHER PUBLICATIONS

Donald G. Fink, John M. Carrol. Standard Handbook for Electrical Engineers; May 1974, 10$^{th}$ Edition, McGrow–Hill Co.*

R. Taylor. Application Note AN34. Crystal Semiconductor Company; Sep. 1994.*

* cited by examiner

*Primary Examiner*—Gregory J. Toatley, Jr.
*Assistant Examiner*—Zeev Kitov
(74) *Attorney, Agent, or Firm*—Knobbe, Martens, Olson & Bear LLP

(57) ABSTRACT

A transformer based power conditioner to provide high purity electrical power. Capacitor based low impedance filters may be connected in the transformer secondary for noise filtering. Surge suppressors may be connected from the start to the finish of the primary windings regardless of tap selection, to limit peak voltages due to transient electrical surges that reach the load. Filter performance can be improved as required by the end user, by cascading the filter circuits on the output lines.

50 Claims, 15 Drawing Sheets

ELECTRICAL POWER CONDITIONER

BACKGROUND OF THE INVENTION

1. Field of the Invention

The present invention relates to a transformer based power conditioner to provide high purity electrical power, preferably having capacitor based circuitry on the transformer secondary to provide noise filtering, and preferably having semiconductors on the transformer primary functioning as suppressors for transient electrical surges.

2. Description of the Related Art

High purity electrical power generally means that the power is substantially free from voltage spikes and sags with no significant neutral-to-ground voltage. A number of electronic devices require such high purity power. Among them are medical imaging systems such as X-rays, computer tomography, magnetic resonance imaging, and radiation treatment systems. All of these devices require a large amount of current but only for a short duration, that is, when the X-ray or magnetic generator is operational. The power during this exposure must be clean for good image quality. Additionally, the stand-by power between exposures must also be clean for the reliable operation of the computerized control and imaging processing subsystems, which operate between exposures. An example of a power conditioner to provide high purity electrical power is shown in U.S. Pat. No. 5,012,382.

For these types of systems, the voltage drop during the exposure period should be minimal, typically less than about 8%. This voltage drop is a result of the impedance of all upstream wiring, connections and transformers in the circuit. The reason for this limitation on voltage drop is that the exposure duration in the medical imaging systems is often calculated based on the magnitude of the line voltage present immediately before exposure. Significant changes in this voltage during exposure can result in unpredictable dosages. It is also important that operation of the generator does not produce voltage sags or spikes on the power lines which interfere with the reliable operation of other system components.

Other systems requiring high purity power include automated test equipment and telecommunications equipment. Automated test equipment (ATE) is used in a number of applications, one of which is the manufacture of semiconductors and printed circuit boards. For example, during the testing of semiconductors (like computer microprocessors) the ATE provides an array of inputs to the microprocessor and detects the response and response speed to those inputs. Impure power can cause the ATE to interpret the responses incorrectly, and as a result, eliminate good parts or retain bad parts. Printed circuit board (PCB) ATE provides an array of inputs to PCBs and determines if the traces have continuity to the desired areas of the PCB. Impure power can cause the ATE to give erroneous indications about PCB continuity. Manufacturers of such equipment continue to reduce the semiconductor and PCB test voltages to reduce the power requirements, allowing the ATE to be smaller and more cost effective for the end user. However, with lower operating test voltages, the susceptibility of the ATE to impure power becomes greater and the need for cleaner power increases.

Telecommunications equipment also requires clean power for similar reasons. Clean power allows the communications equipment to transmit with higher quality. This results in better sound and data quality and fewer dropped connections. Another advantage is that clean power ensures that telecommunications equipment will continue to operate without interruption for longer periods.

Surge suppression devices or L-C filters, or both, on the building wiring near the load provide another way to achieve the desired power quality. These devices shunt impulses above certain voltage or frequency levels from one wire to another. They typically are comprised of metal oxide varistors (MOVs), silicon avalanche diodes (SADs), gas discharge tubes, capacitors and inductors, and often incorporate resistors. An example of a transient voltage surge suppressor using MOVs and silicon surge suppression diodes is discussed in U.S. Pat. No. 4,802,055. Another example of MOVs used for electrical transient suppression is described in U.S. Pat. No. 5,038,245. Still another example of a way to suppress transients is discussed in U.S. Pat. No. 4,156,838, which does not employ magnetic coupling.

There are several limitations with many of these types of devices and filters. They shunt away voltage spikes or dips ("normal mode noise"), but in doing so increase the current in the neutral conductor, creating neutral-ground potentials ("common mode noise") which can be even more damaging or disruptive than normal mode noise. Their effects are limited since they can only protect to a certain voltage or frequency level. For example, MOV's and avalanche diodes "wear out" with time and lose their effectiveness.

For this protection scheme to be as effective as possible, the inductance in series with the shunt elements (surge suppressors and capacitors in L-C filters) must be minimized. The wire length connecting the suppressors to the conductors makes a measurable difference in their effectiveness. Often, these devices are connected to the power lines by wires which are five to 50 feet in length due to physical placement constraints in the field or limited knowledge on the part of the installers, or both. The length of the wires between the power lines and the suppressors also limits the effectiveness of scaling the product for optimal performance. Surge suppressors are also frequently sized inappropriately to simplify installation at the expense of performance.

Also limiting the performance of shunt elements is the lack of ability to improve performance by cascading the filtering elements. Many of these filters employ single stage filtering that limits the effectiveness of the elements within the suppressors.

In an attempt to minimize lead length, maximize performance, and make site performance consistent, series power line filters have been used in these applications. Many of these devices have a series element (typically an inductor) that adds impedance to the line and increases cost significantly, but improves high frequency filtering performance greatly. The added series impedance has negative effects on power quality, particularly voltage regulation, during high current demand, as described earlier. It also limits the cost effectiveness of scaling these types of products.

Another alternative solution is to use a conventional shielded isolation transformer. The shield in the transformer increases the isolation of the output from the conducted ground (common mode) noise. A neutral-ground bond converts common mode noise to normal mode noise and allows a more effective use of filters and surge suppressors on the transformer as described above.

The extra impedance of the series power line filters (with inductors) or shielded isolation transformer methods results in lower power quality when the filters or transformers interact with computer loads. Modern computers have "switch mode" power supplies which draw their current in short bursts where the change in current with respect to time (di/dT) is fast, being the equivalent to 120 Hz or greater, instead of the usual 60 Hz for most conventional loads. Even at low load factors, these rapidly varying loads cause conventional transformers to produce outputs with a flat-topped voltage waveform and voltage spikes. Other switching transients within the system only add to the problem.

Often shielded isolation transformers and suppression/filtering devices are combined in the field in an attempt to provide the quality power desired. The limitations mentioned above also apply to this combination.

In contrast to the use of passive shunt element based solutions, other attempts to provide high purity power for these systems have utilized conventional voltage regulation schemes. Those attempts have generally not been successful. Electronic-controlled tap-switching voltage regulators are undesirable because the step voltage changes produced by tap changes during exposure often cannot be tolerated. Motorized variac solutions are typically not fast enough to compensate for most common power quality problems. Saturable-core ferroresonant transformers are also unacceptable as they have very high impedance and slow reaction time. They interact with the pulsed load by creating large voltage transients. None of these approaches can effectively produce the power quality required by the systems described earlier.

Thus the challenge in the prior art is to provide high quality power as previously defined to a load having relatively high peak pulsed power and moderate average power requirements, with a relatively small, economical power conditioner.

SUMMARY OF THE INVENTION

The present invention solves the problems stated by means of an improved power conditioner circuit which includes a special type of power line filter system having a low series impedance at both 60 Hz and at high frequencies when compared to conventional filters. This low impedance filter, coupled with a low impedance isolation transformer, provides superior power quality for loads with high peak pulsed power requirements. The power line filter system can be cascaded to increase performance in a cost-effective manner. The filter system may include suppressor elements in some embodiments.

This power line filter system incorporates several features not found in conventional filter systems. One feature of the invention is that the filter for each phase is connected to the secondary of the transformer before the phase-to-phase bond. The neutral conductors of each phase's filter are physically separated from one another to minimize coupling of high frequency components from input to output of the filter. A second feature is the specific way of internally wiring two or more separate shunt capacitors within the individual filter module. The shunt capacitors and their connections are physically separated from one another to minimize coupling of high frequency components from the input to the output of the filter module. Another feature is that the location of the filter inside the power conditioner enclosure delivers consistent, high performance of the system from site to site because the wiring is as short as possible, typically less than two inches and preferably approaching zero length. Also because of the compact nature of the power circuitry in the power conditioner enclosure, the wiring can be maintained in a production-controlled environment to ensure production consistency.

Another feature of the power line filter system of the invention when suppressor elements are included is the manner in which the suppression elements are connected to each primary winding. The suppressors are connected across the entire tapped winding, regardless of which tap is connected to the power line input. This connection scheme advantageously uses the magnetic coupling of the extended windings that are electrically connected to the input power line windings. Connecting the suppressor in this manner clamps transients more effectively than placing the suppressor directly across the power line input.

Transformers are often made with multiple primary sections for connection in series or in parallel to accommodate the different standard input voltages worldwide. A further feature of the invention is the use of an individual suppressor across each of the multiple primary winding sections in the transformer. The magnetic coupling between the primary sections causes the suppressors to share the current accompanying a high voltage transient, providing more reliable performance and a longer life for the suppressors.

One aspect of the present invention involves a transformer-based filtered power conditioning system, the system including a system ground or neutral. The system has a transformer having primary and secondary windings with the primary windings having input connections and the secondary windings having output connections. Input power lines are connected to the primary winding input connections and are adapted to be connected to a source of electrical power. In one embodiment, surge suppression elements are connected across the ends of each primary winding. Preferably, the surge suppression elements are connected to the start and finish points for each coil in the primary, regardless of tap selection for the input power.

In one embodiment, at least one filter circuit is provided, comprising at least one input shunt leg and at least one output shunt leg, each shunt leg having at least one resistor and at least one capacitor between two connections, thereby forming R-C circuits. Advantageously, a very low impedance element is connected between the connections of the input and output shunt legs, wherein a first connection of the input shunt leg is connected to one polarity of the secondary windings, a second connection of the input shunt leg is connected to the opposite polarity of the secondary windings; a first connection of the output shunt leg is one polarity of the output of the power conditioning system and is adapted to be connected to a load or to a first connection of an input shunt leg of a second filter circuit, and a second connection of the output shunt leg is the opposite polarity of the output of the power conditioning system and is adapted to be connected to a load and optionally connected to system neutral and ground, or to a second connection of an input shunt leg of a second filter circuit.

In one embodiment, the suppression elements are selected from the group consisting of metal oxide varistors (MOVs), silicon avalanche diodes (SADs), gas discharge tubes, and capacitor and inductor combinations, the combinations selectively including resistors. In one embodiment, the capacitors in each shunt leg are substantially equal in capacitance, and in another embodiment, the capacitors in each shunt leg are unequal in capacitance.

In one embodiment, the filter circuit further has an inductor.

Advantageously, the low impedance connecting the ends of the shunt legs comprises an electrically conductive element to which the shunt legs are mounted with the mountings being spaced apart on the electrically conductive element. The system is also preferably scalable by adding additional filter circuits to the secondary winding outputs.

In one embodiment, the filter circuits have an anti-parallel diode arrangement connected across each resistor in each shunt leg. In one embodiment, the filter circuit is connected between the secondary windings and the output neutral, and the connection to system ground is a phase-to-phase neutral bond The power conditioning system is a three-phase system in one embodiment, but may also be a single-phase system in another embodiment, and is adaptable to any number of phases.

Other additional features of the invention which provide further improvements are described below.

BRIEF DESCRIPTION OF THE DRAWINGS

The objects, advantages and features of this invention will be more readily appreciated from the following detailed description, when read in conjunction with the accompanying drawings.

DETAILED DESCRIPTION OF THE PREFERRED EMBODIMENT

Figure 1A:
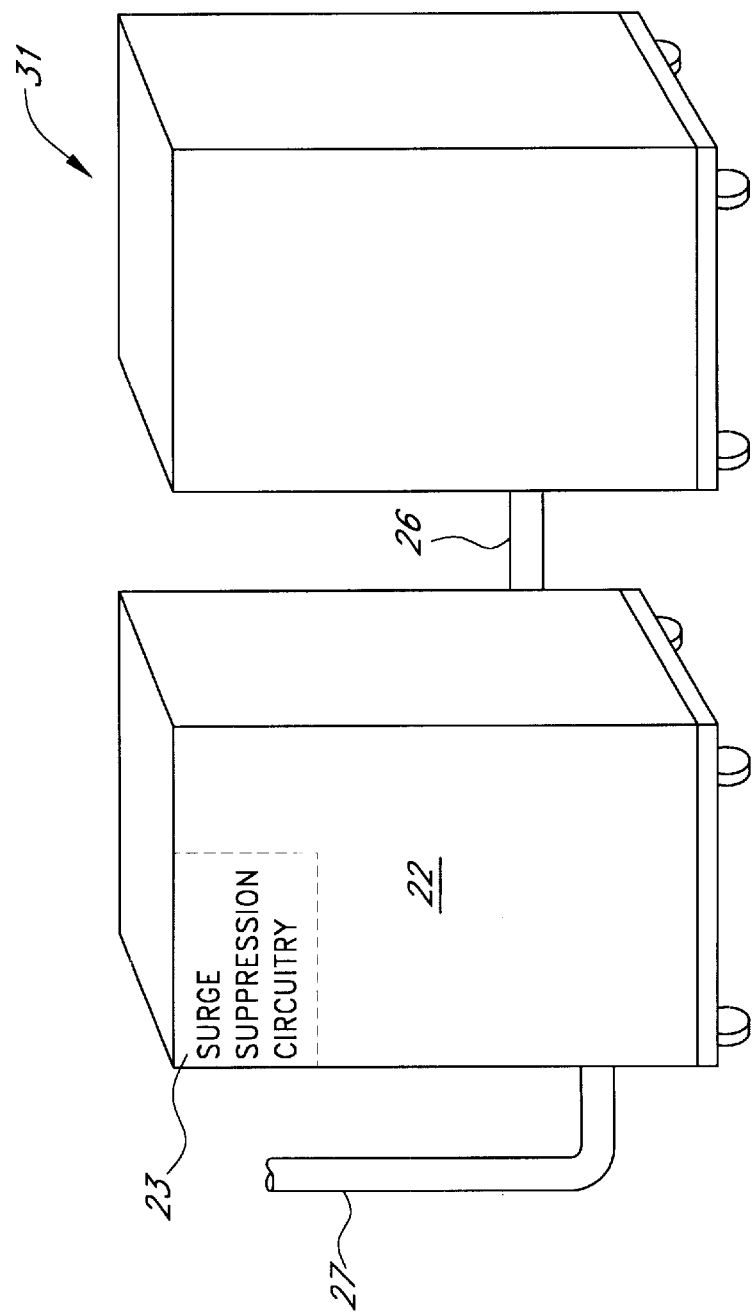
FIG. 1A is a perspective view of a typical load, and a power distribution unit enclosure which contains the power conditioner circuit of the invention.
Figure 1B:
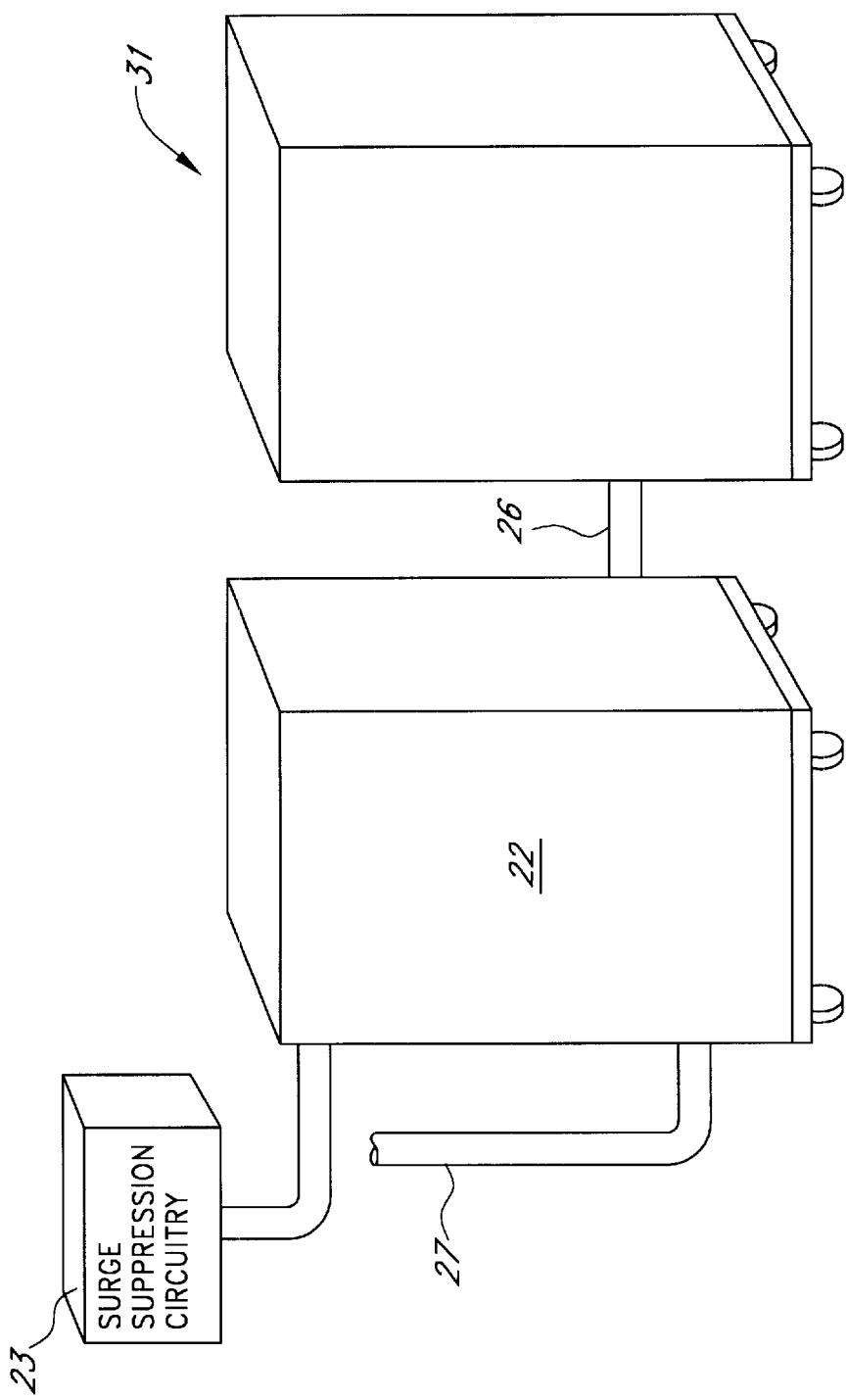
FIG. 1B is a perspective view of the typical load, and a power distribution enclosure with any part or all of the power conditioning circuit in a separate external enclosure.

FIG. 1A depicts a cabinet 22 which houses a power conditioner transformer circuit of the invention. Auxiliary circuits may also be contained within the enclosure. Incoming power enters the system through line 27 and output line 26 supplies conditioned power to the equipment or load 31. Although the power conditioner and the load are shown as separate cabinets, they could both be in a single enclosure. In addition, although FIG. 1A depicts the surge suppression circuitry 23 internal to cabinet 22, such circuitry 23 could also be provided external to cabinet 22 as depicted in FIG. 1B.

Figure 2:
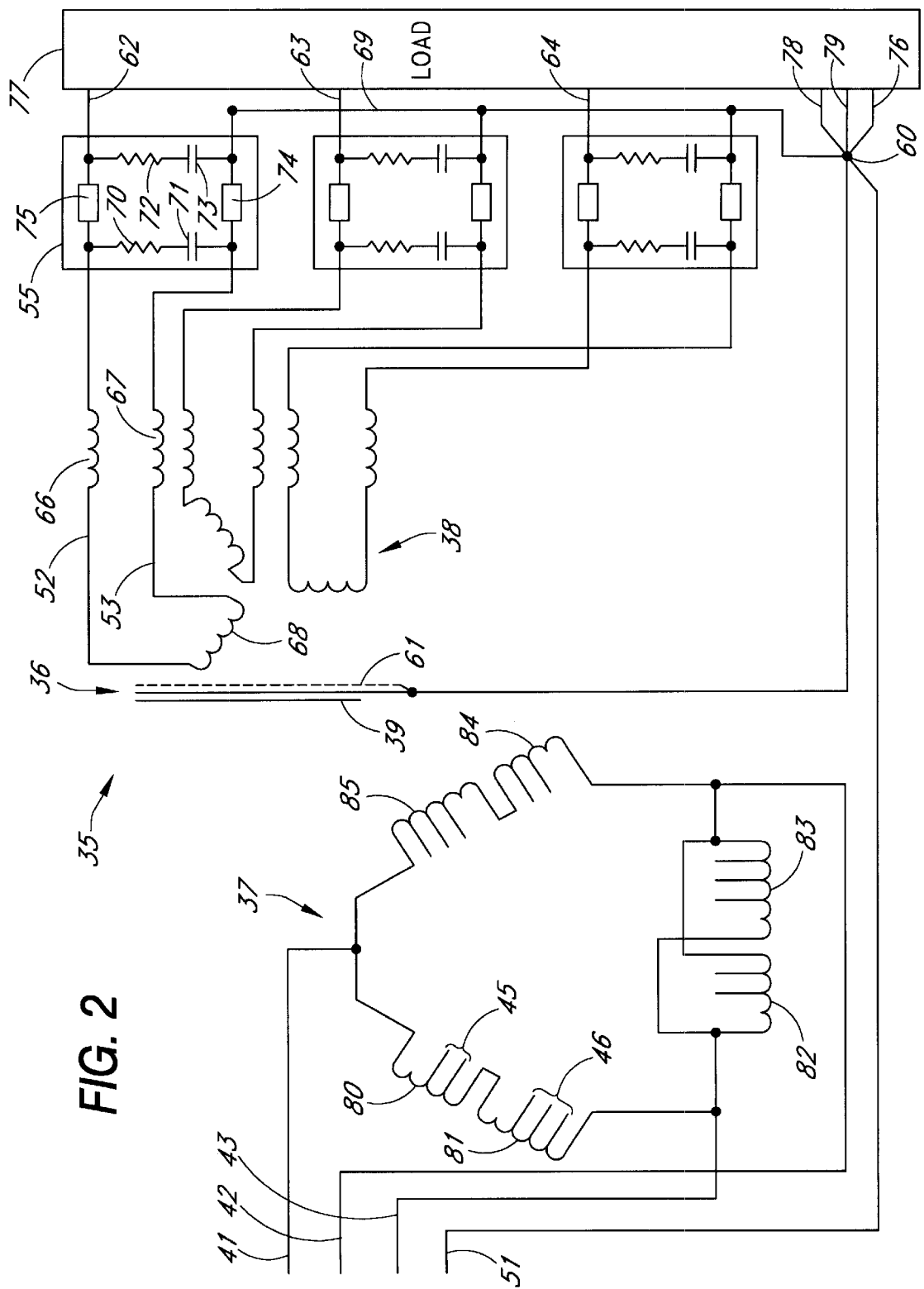
FIG. 2 is a schematic representation of an embodiment of a power conditioner circuit in accordance with the invention, showing how the transformer output is modified and how the power conditioner is connected to a sensitive electrical load.

FIG. 2 illustrates a power conditioning circuit 35 comprised partially of isolation transformer 36 having primary 37, secondary 38 and iron core 39. The input to primary 37 includes input phase conductors 41, 42 and 43, which are configured to be connected to an appropriate electrical power source. Line 51 is the input ground line and is preferably the legal minimum in size in accordance with NEC standards in the present embodiment. It is contemplated that the transformer will be equipped with conventional taps 45, 46 off the primary windings, enabling the transformer to correct for chronic low or high line voltage by connecting the input phase conductors 41, 42 and 43 to the appropriate respective taps. Note also that primary segments 80, 81 and 84, 85 are connected in series. By way of example, primary segments 82, 83 are shown connected in parallel. Either arrangement can work.

In one embodiment, the transformer 36 may be a shielded isolation transformer, as indicated by dashed line 61 representing a metal sheet positioned between the primary and secondary windings of the transformer. A zig-zag transformer, an auto-transformer, tap switchers, variacs, or a non-shielded transformer, among others are also appropriate for use with the present invention.

Each output line 62, 63 and 64 of the power conditioner includes filter circuits 55 that have at least capacitors connected to the transformer prior to the phase-to-phase neutral bond 60. Preferably, a resistor 70 is connected in series with capacitor 71. The resistor 70 may be either a resistor or merely a wire, with the small resistance of the wire providing resistance. In one embodiment, as shown in FIG. 2, the filter circuits also include inductors. For example, shown in finish line 52 of secondary coil 68 is inductance 66. This can be a separate component or the leakage inductance of transformer 36, or both. Similar inductance 67 is included on the other, or start line 53 of secondary winding 68. This side of the winding leads to neutral 60 through line 69. Connected between lines 52 and 53 is the series combination of resistor 70 and capacitor 71 in filter 55. Resistor 70 can be either an actual resistor component or the resistance of the wire that connects the capacitor to the line. Connected between lines 62 and 69 is a similar series combination of resistor 72 and capacitor 73. Between the resistor and capacitor combinations or shunt legs are very low impedance devices 74 and 75, which can either be conductors, resistors, or inductors. A preferred arrangement is for impedance devices 74 and 75 to be a bar of conductive material, such as copper. Other highly conductive materials could be employed. By having each resistor/capacitor leg of filter 55 physically connected at spaced locations on each very low impedance device, a very small but measurable impedance will result between the two resistor/capacitor legs. "Very small" in this context is as low as one pico ohm. Filter performance was found to improve as impedances 74, 75 increased, and were tested to 1 mΩ. It is contemplated that filter performance will continue to increase as the impedance increases, but overall system performance will be degraded as the voltage drop through impedances 74, 75 becomes significant. It is preferred that capacitors 71 and 73 have equal capacitance but that is not a requirement. Those two capacitors may differ in capacitance in any practical manner which still meets the filter requirements.

The shunt legs of the filter 55 formed of the resistor capacitor series combination which are connected with a low impedance element 74, 75 could be described as having first, second, third and fourth quadrants: The first quadrant being the connection of the filter circuit 55 connected to one polarity of the secondary winding 68, the second quadrant of the filter circuit 55 being considered the connection which is connected to the opposite polarity of the secondary winding 68, the third quadrant of the filter circuit 55 being considered one polarity of the output of the power conditioning system and being adapted to be connected to the load via line 62 and the fourth quadrant of the filter circuit being considered the opposite polarity of the output of the conditioning signal and being adapted to be connected to a load or to a system neutral/ground 60.

A similar filter or suppressor structure is connected in the other two transformer secondary output lines and need not be discussed in detail here.

Ground line 76 is provided for a supplemental ground if necessary, and as may be required in some instances for applications that require this ground, such as applications where each article requiring power also requires its own ground or its own grounding stake connection.

Sensitive electrical load 77 is the type of system discussed previously, which may be an X-ray machine, magnetic resonance imaging system or other system requiring high power for short time durations, or systems such as automated test equipment or telecommunications equipment that simply require very clean power. Output phase conductors 62, 63 and 64 are relatively large and preferably quite short, which provides higher quality power by minimizing impedance and pickup of radiated noise from other electrical lines or other interference sources. Lines 78 and 79 are derived neutral and ground respectively.

The resistor/capacitor filter legs in the output of winding 68 may have several different types of components to further optimize performance for a particular type of load. For example, these filter legs could incorporate MOVs, SADs, gas discharge tubes, or inductors, among others, either in place of or in addition to the elements shown. Other additional features will be discussed below.

Figure 3:
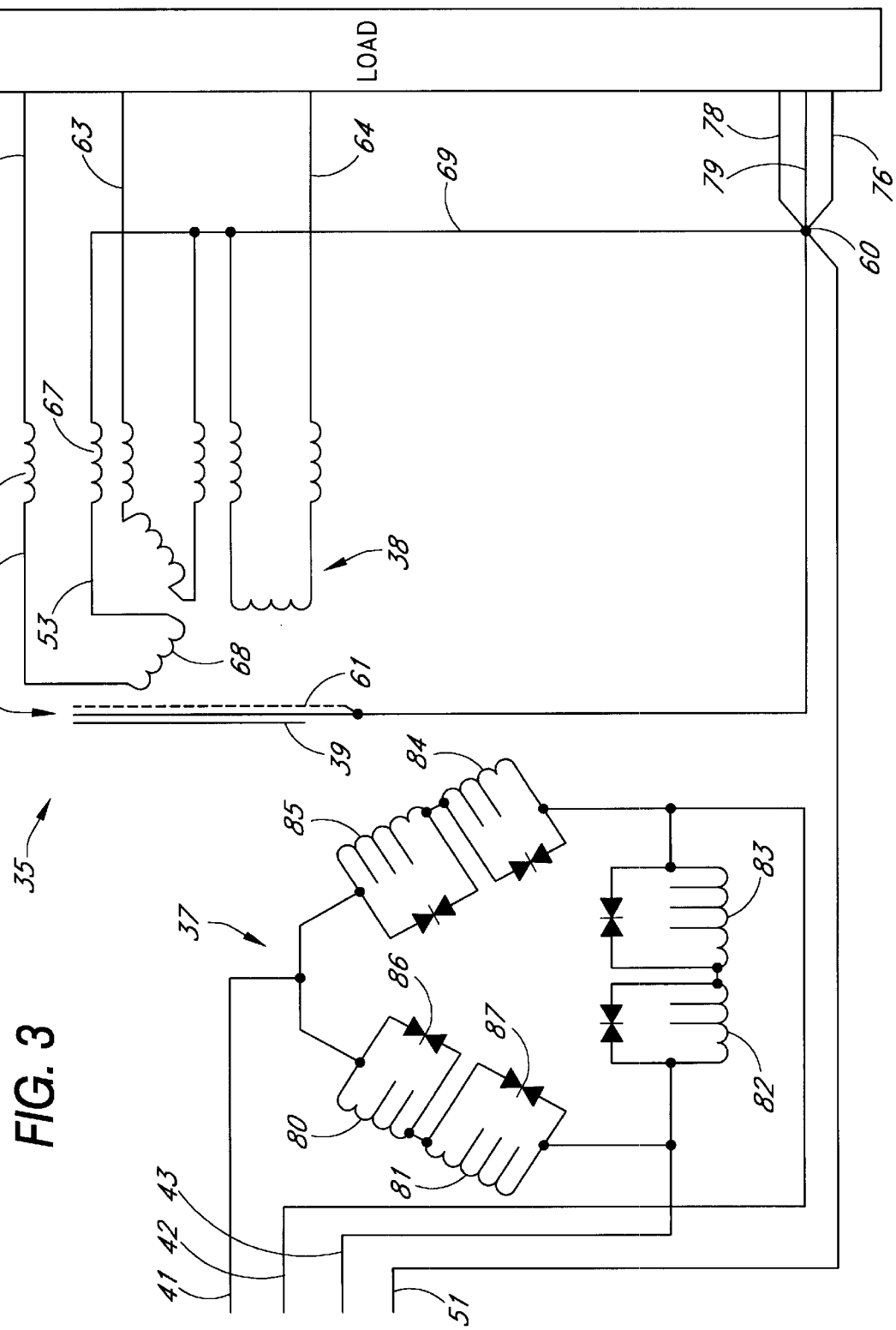
FIG. 3 is a schematic circuit showing an alternative embodiment of the invention, with suppressors on the transformer input.

In the embodiment of FIG. 3, the same isolation transformer is shown having the same output windings, but without the R-C filter structures. In this arrangement of the invention, each primary winding 80, 81, 82, 83, 84 and 85 of transformer primary 37 includes surge suppression elements 86, 87 connected between the start and the finish of each winding. Windings 80 and 81 are connected as shown to make up one phase of the primary of the transformer. Each suppression element should be rated to accommodate for the maximum voltage of its associated primary coil. The magnetic coupling of the windings 80 and 81 permit the suppression elements to clamp the input voltage in all primary wiring variations. Additionally, the magnetic coupling of 80 and 81 has the benefit of also forcing more equal energy distribution between suppression devices 86 and 87 than would occur by simply placing two suppression devices in parallel. This leads to less stress and longer life for the suppression devices as well as improved performance.

Surge suppressors 86 and 87 could be metal oxide varistors (MOVs) or silicon avalanche diodes (SADs), among others, which are connected in parallel with one or both primary windings 80 and 81 or any portion of either primary winding. A similar suppression structure is connected in parallel with windings 82, 83, 84 and 85 and need not be discussed in detail here.

It has been found that the basic objectives of the invention can be satisfied by this embodiment of the primary, without the enhancement of the secondary filters shown in FIG. 2.

Figure 4:
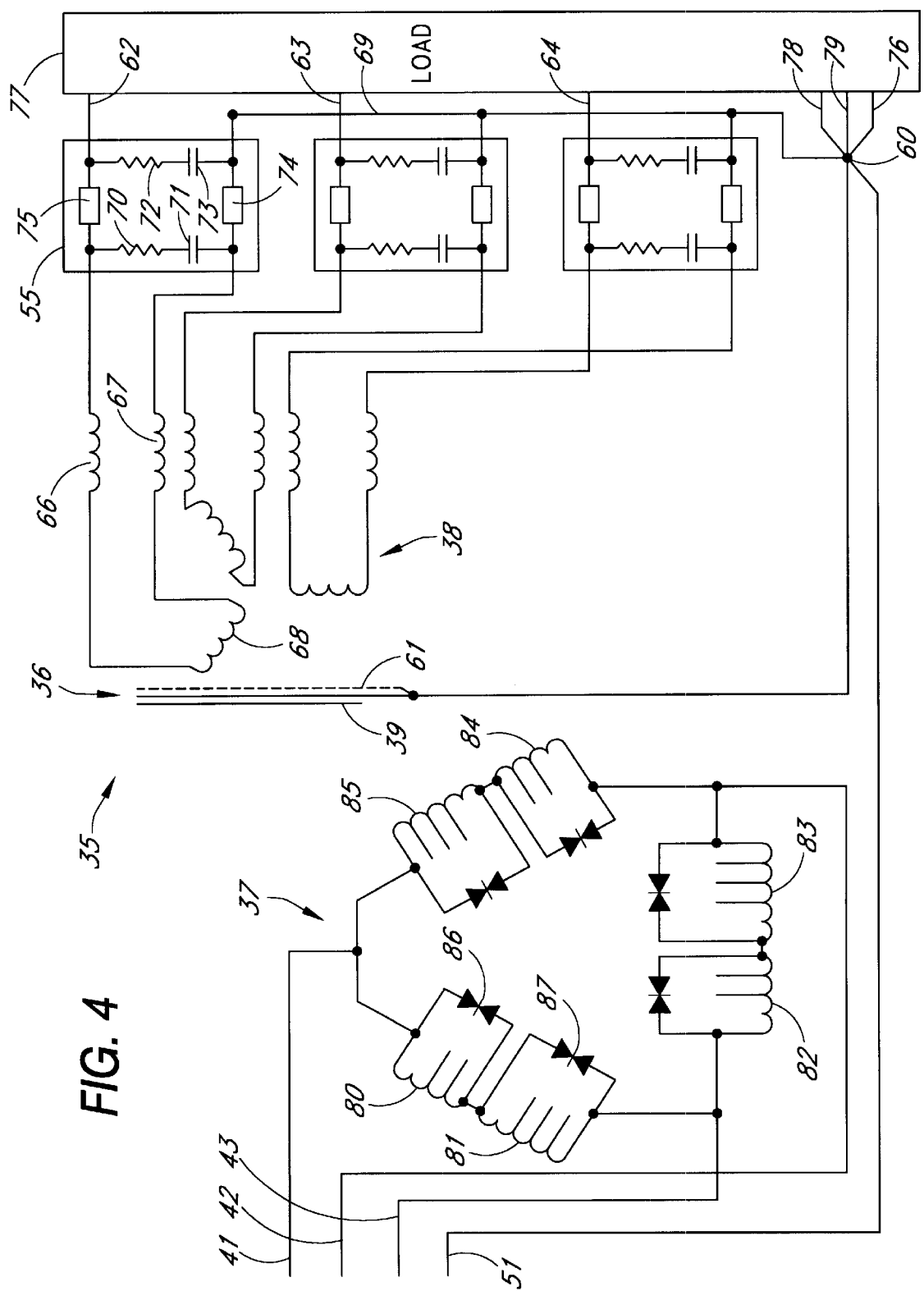
FIG. 4 is a schematic representation which combines the features of FIGS. 2 and 3.

FIG. 4 is a schematic diagram of a preferred embodiment which includes the features of FIGS. 2 and 3 in a single combined structure. The combination provides for even better power purity because of the combined effects of the surge suppression devices on the input windings and the filter arrangements in the output windings of the transformer. There are many advantages to the power conditioning circuit of this invention, particularly the combination depicted in FIG. 4. This power conditioner provides cleaner power than any known approach, regardless of the size or rating of the transformer. The circuit of FIG. 4 attenuates incoming or line-side disturbances with the magnetically coupled surge suppressors, the transformer leakage inductance, the transformer shield, and the L-R-C filters installed, preferably within inches of the output phase conductors. It is contemplated that the inductance in the L-R-C filter may be only the transformer leakage inductance, or an additional inductor may be employed. Note that, as previously stated, in many prior systems the transformer is located outside the room in which the load is positioned. Filters and surge suppressors, when used, have often previously been located between five and 50 feet from the output line. By having the filter suppression system in the same cabinet as the transformer, represented by enclosure cabinet 22 in FIG. 1 (and thereby all of the system elements, including breakers and surge suppressors, to name a few), the components can each be located with respect to one another at minimum distances for optimum filtering performance. As stated before, preferably those distances are minimized (as close to zero as practically possible).

Output, or load generated disturbances are also attenuated by the low power conditioner impedance and output filters. This helps decouple various connected loads. The low impedance neutral-ground bond eliminates incoming ground noise and attenuates load generated common mode noise.

Figure 5:
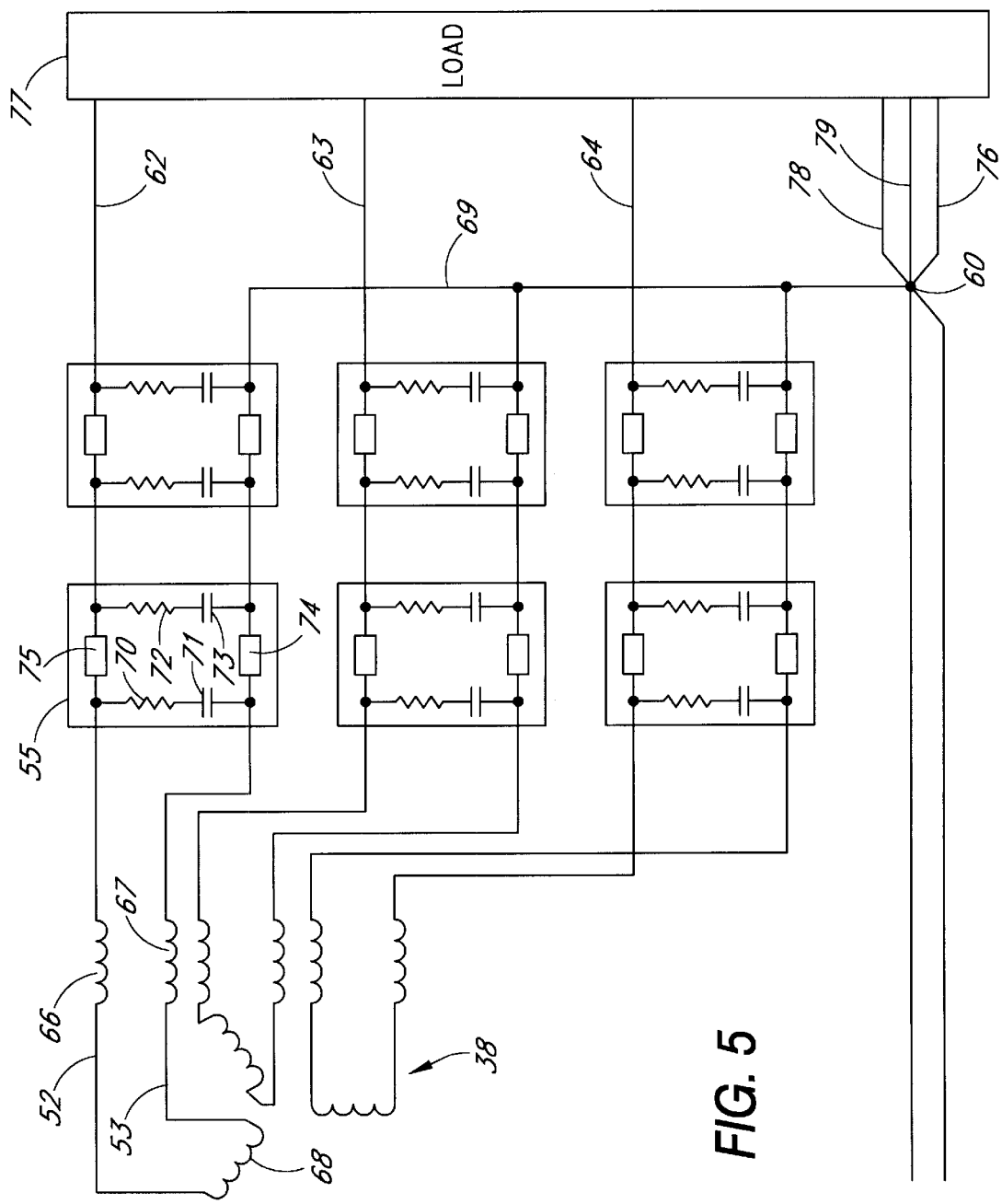
FIG. 5 is a further alternative arrangement of the output of the transformer of FIG. 2 in accordance with the invention.

The embodiment of FIG. 5 has added features which may be incorporated into the circuits of FIG. 2 or FIG. 4. This embodiment adds additional R-C filter circuitry in cascade fashion to the transformer output windings to make the output scalable as may be required to optimize filter performance and cost. While two dual leg resistor-capacitor combinations are shown, additional filter modules could be added in the output windings of the transformer to improve performance further, as required. The structures and functions are the same as previously described.

Figure 6:
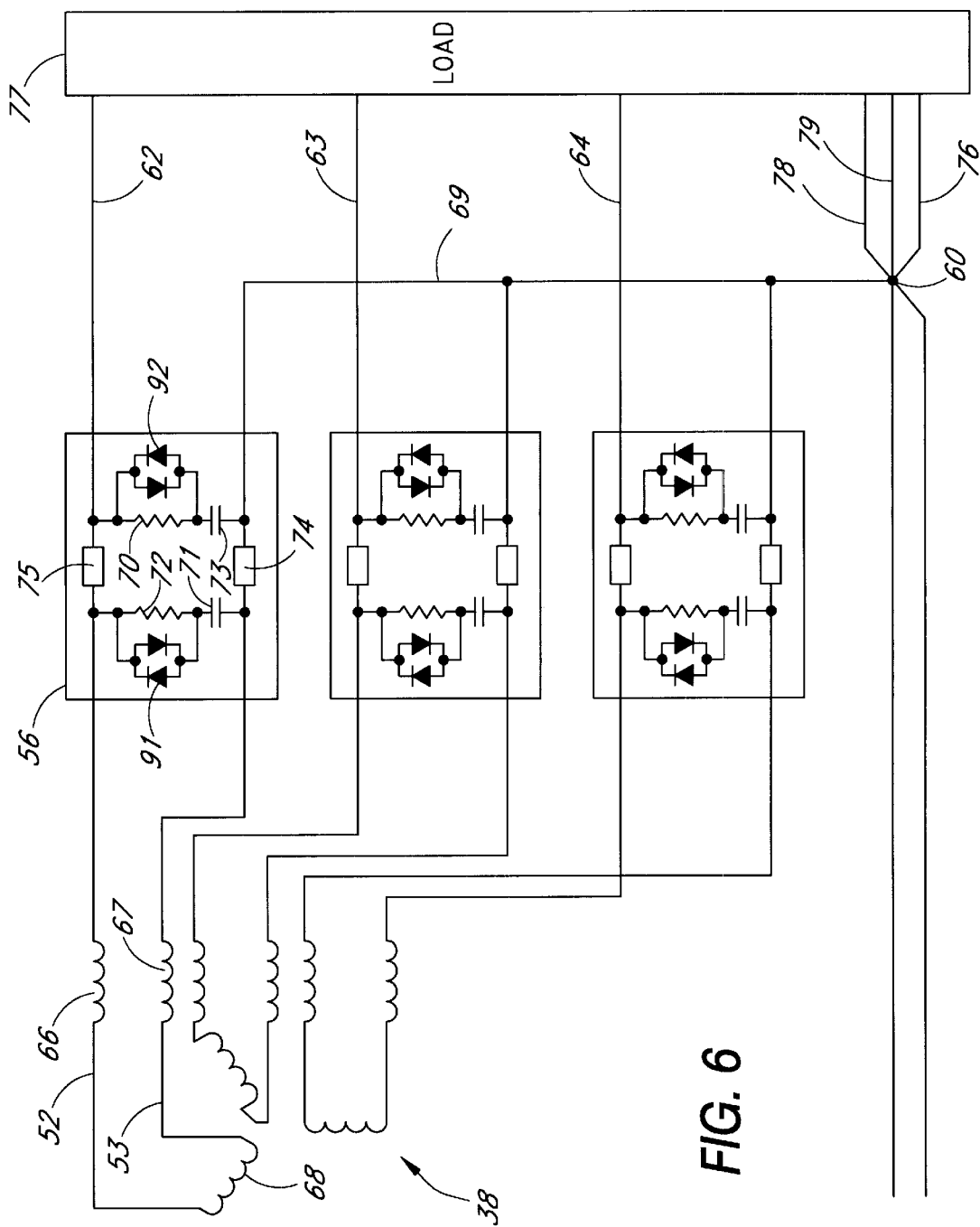
FIG. 6 is another alternative schematic arrangement of the output of the transformer of FIG. 2.

Another set of features which may be incorporated into the invention of FIGS. 2, 4 or 5 is shown in FIG. 6. Connected across each resistor 70, 72 in filter 56 is antiparallel diode combination 91, 92. These serve to further enhance the surge suppression and filtering effectiveness of the transformer output winding filter circuitry.

Figure 7:
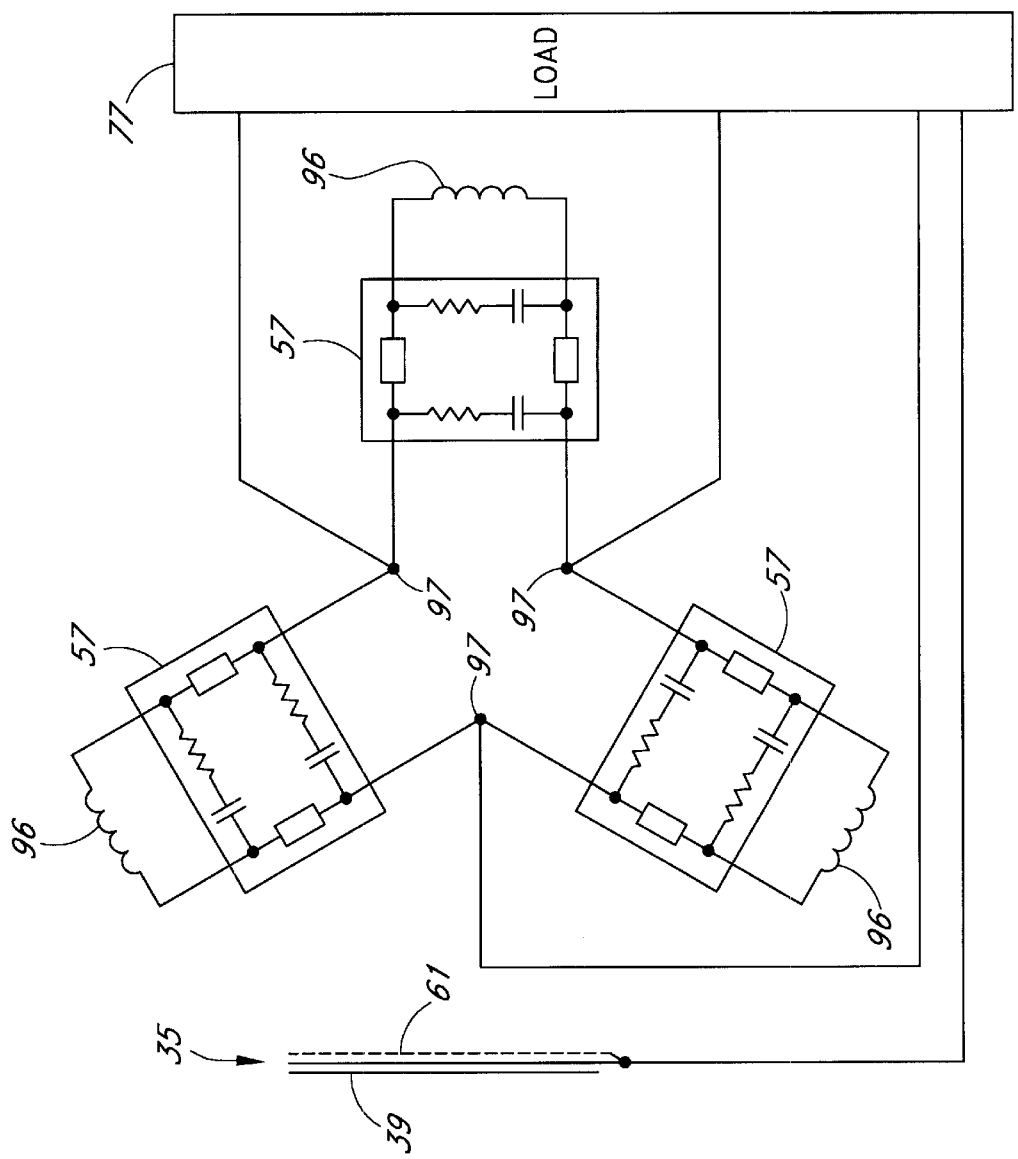
FIG. 7 shows a delta configuration of the output of the windings of the transformer of FIG. 2.

The discussion of the invention and its features to this point has considered a wye secondary transformer configuration. The invention works as well with a delta secondary configuration, as shown in FIG. 7. All the previously discussed advantages, features and considerations apply to this transformer type so detailed discussion of FIG. 7 is not necessary. Filters 57 are connected between secondary coils 96 and phase-to-phase connections 97 of the secondaries, following the pattern of the FIGS. 2 and 4 embodiments.

Figure 8:
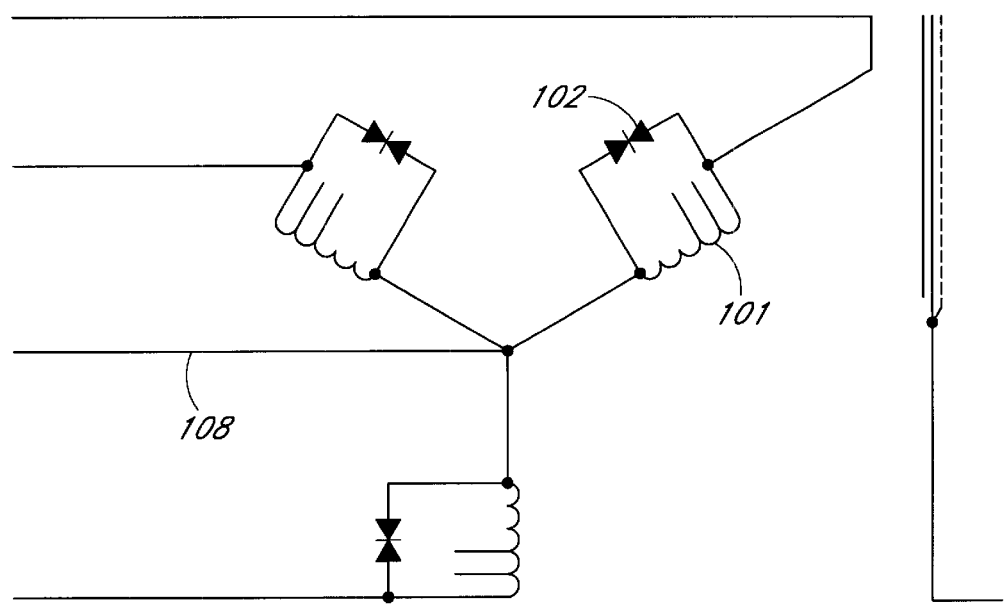
FIG. 8 is an alternative arrangement of the input side of the transformer of FIG. 2.
Figure 9:
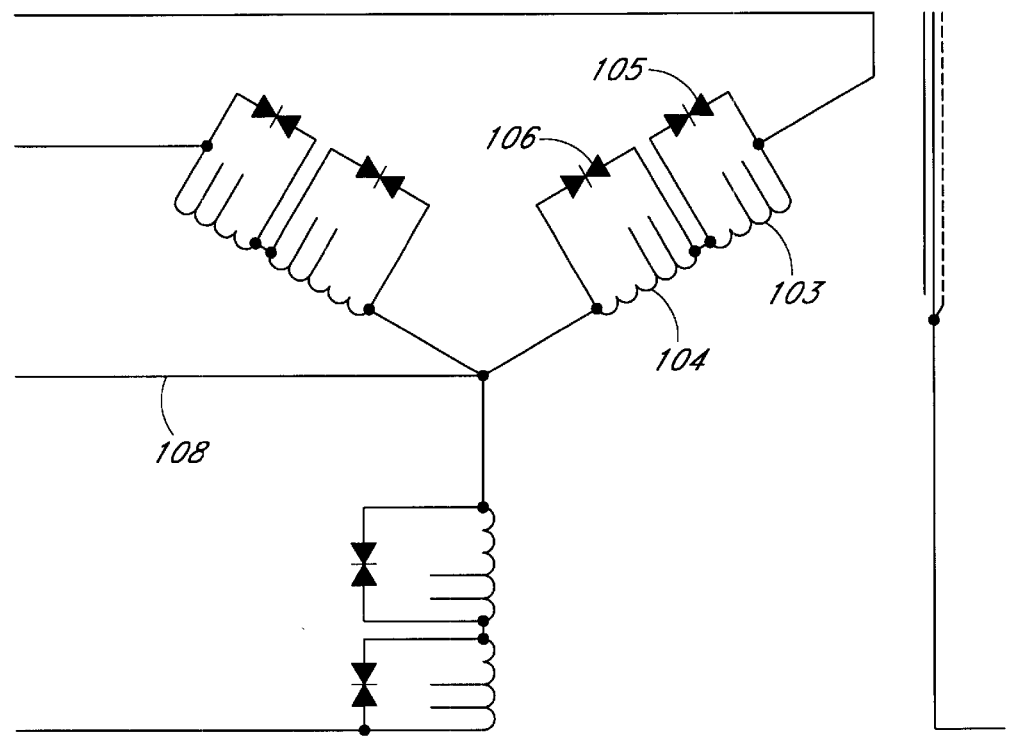
FIG. 9 shows a further alternative arrangement of the input side of the transformer of FIG. 2.

That the transformer primary is not limited to the delta configuration of the previous figures and may also have a wye configuration is depicted in FIGS. 8 and 9. FIG. 8 shows the example of each primary winding 101 being a single segment with a suppressor device 102 connected across it. The wye configuration of FIG. 9 shows split primaries as discussed previously, each primary winding segment having a suppression device 105, 106 connected across it. Building neutral is represented by line 108 in each of these two figures.

Figure 10:
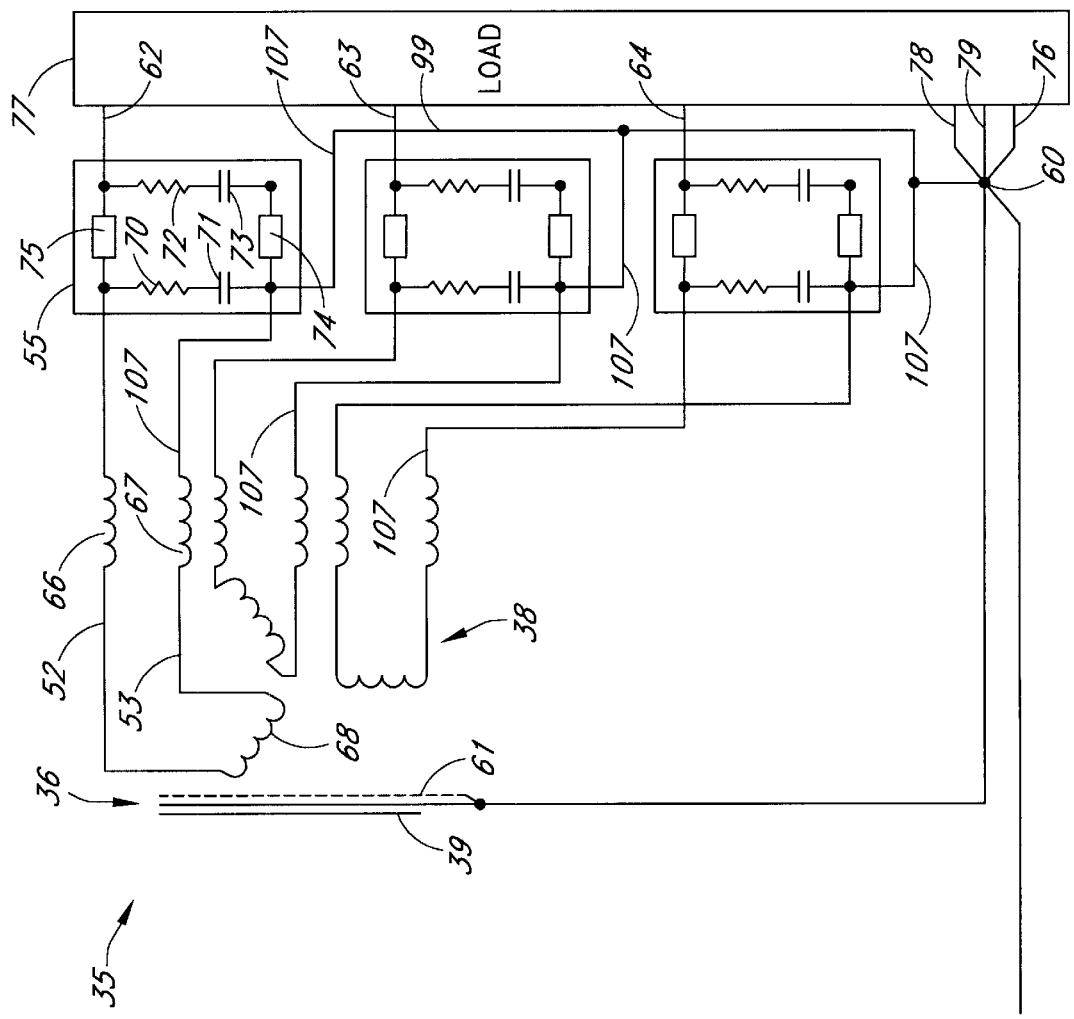
FIG. 10 is a further schematic arrangement of the output side of the transformer of FIG. 2.

A transformer output side is shown in FIG. 10, with the start of each secondary coil being connected to the load through the R-C filter. In this case the start 107 of each secondary coil is connected directly to system ground 60. This is an alternative arrangement of the secondary coil connections.

Figure 11:
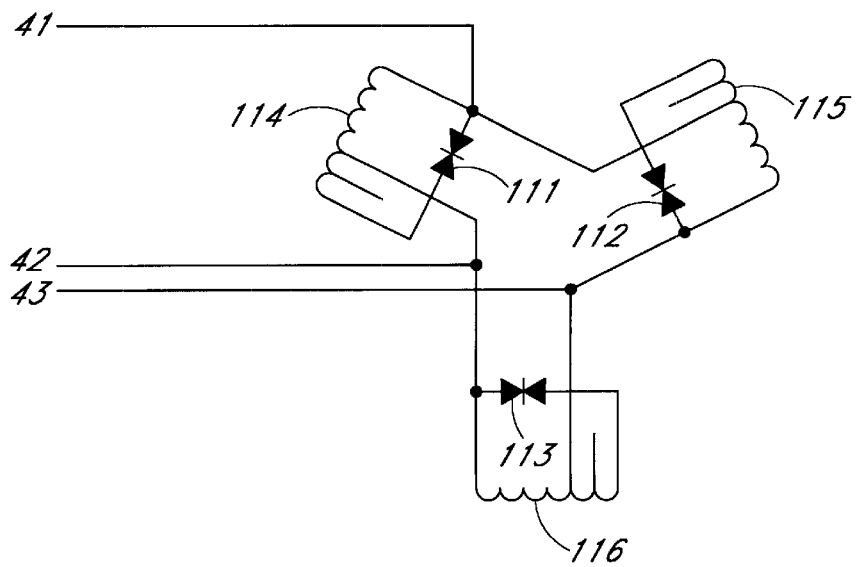
FIG. 11 is an alternative schematic arrangement of the primary windings in a delta configuration.

An alternative arrangement of the primary windings and their connections to the input power lines is shown in FIG. 11. Here input phase conductors 41, 42 and 43 connect to the winding taps. Suppressor elements 111, 112 and 113 are connected across the ends of primary windings 114, 115 and 116, respectively. This is a delta configuration.

Figure 12:
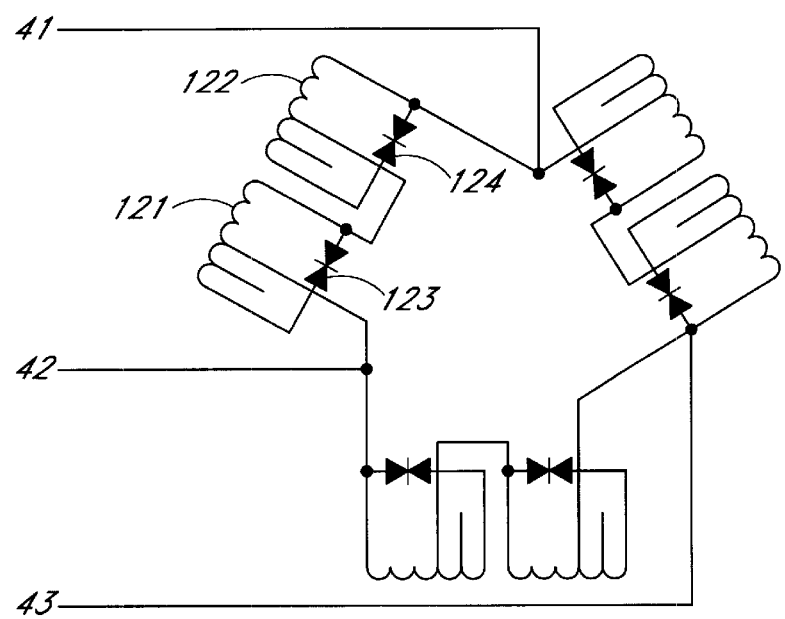
FIG. 12 is another alternative delta configuration schematic arrangement of the primary windings.

Another alternative arrangement of the primary windings in a delta configuration is shown in FIG. 12. The windings are dual coils 121, 122, each with suppressor elements 123 and 124, respectively, connected across the coil segment ends. The primary coils are wired in series and, as in FIG. 11, the input voltage 41, 42, 43 is applied to the coil taps. Only one coil pair is specifically described but the others are connected the same way.

Figure 13:
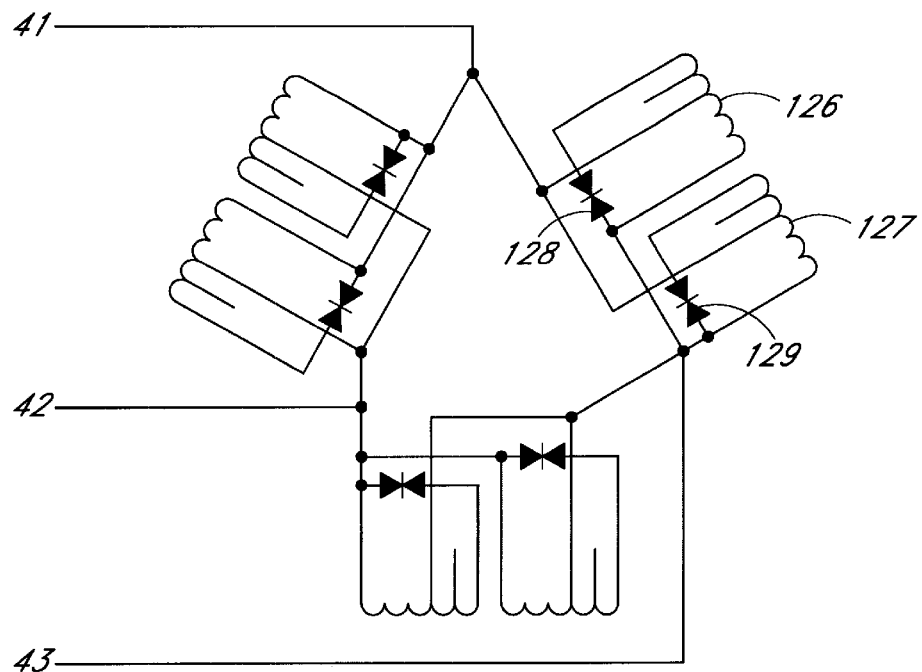
FIG. 13 is a further alternative delta configuration schematic arrangement of the primary windings.

Still another arrangement of the input voltage and the primary coils is shown in FIG. 13. Input line 41 is connected to the taps of coils 126, 127, each of which has a suppressor element 128, 129 connected across the coil ends. The other two primary dual coils are similarly connected. In this embodiment the segments of each split primary are connected in parallel. This is also a delta configuration.

Figure 14:
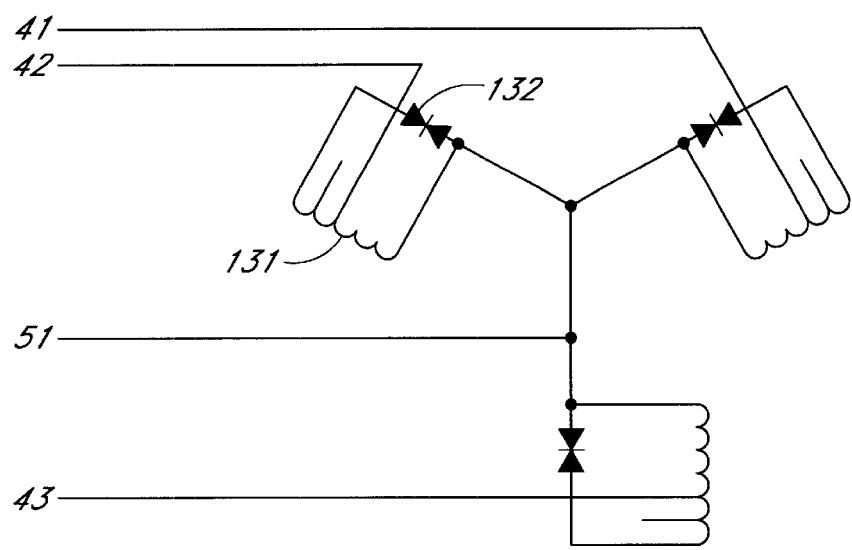
FIG. 14 is yet a further alternative schematic arrangement of the primary windings in a wye configuration.

FIG. 14 shows a wye configuration of the primary windings. Suppressor 132 is connected across the ends of winding 131, while input voltage 42 is connected to a tap of the winding. The same is true of the other windings shown. Neutral is designated by reference numeral 51.

Figure 15:
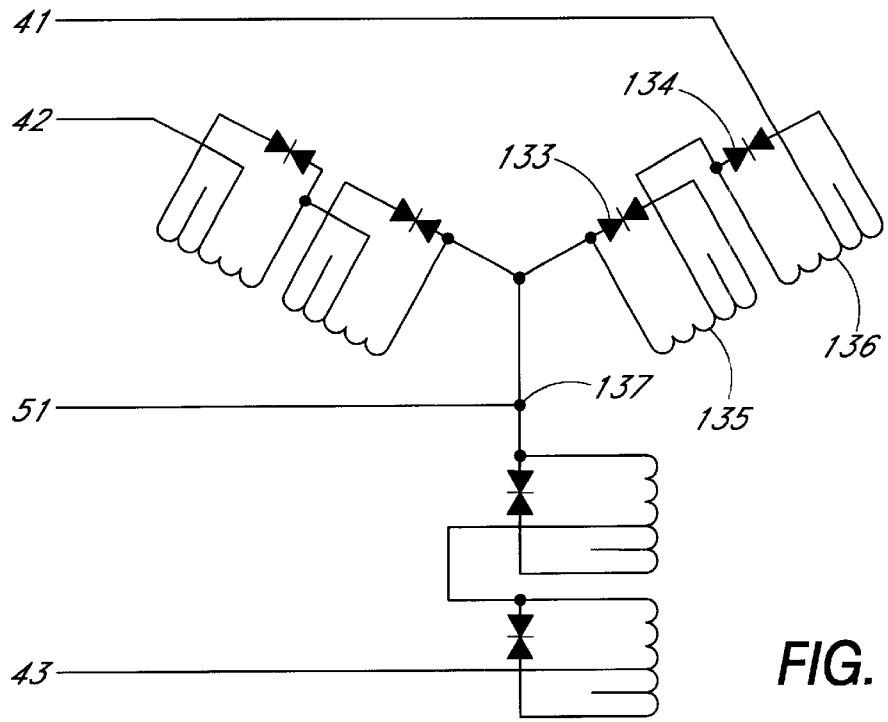
FIG. 15 is a further alternative wye configuration of the primary windings.

Another wye configuration is shown in FIG. 15. Suppressor elements 133, 134 are connected across the ends of coil segments 135, 136. Neutral line 51 is connected to common node 137. The primary coils in each split pair are connected in series.

Figure 16:
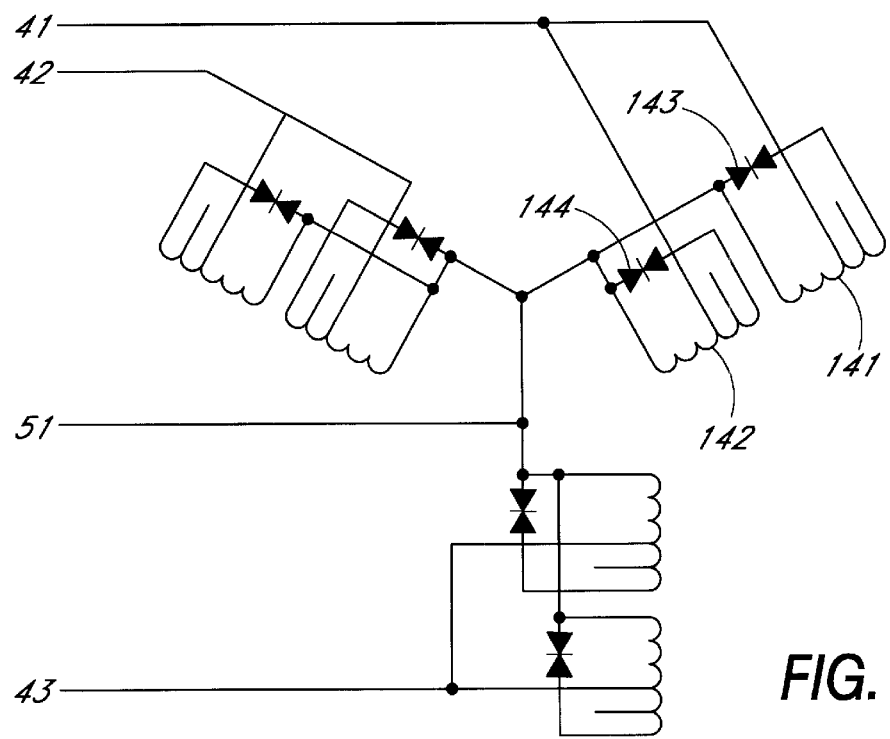
FIG. 16 is a still further alternative wye configuration of the primary windings.

FIG. 16 shows still another wye configuration of the primary windings. This time the split primary segments are connected in parallel. The input voltage line 41 is connected to the taps of coil segments 141, 142, each of which has a suppressor element 143, 144 across the ends. Neutral 51 is connected the same as before.

Figure 17A:
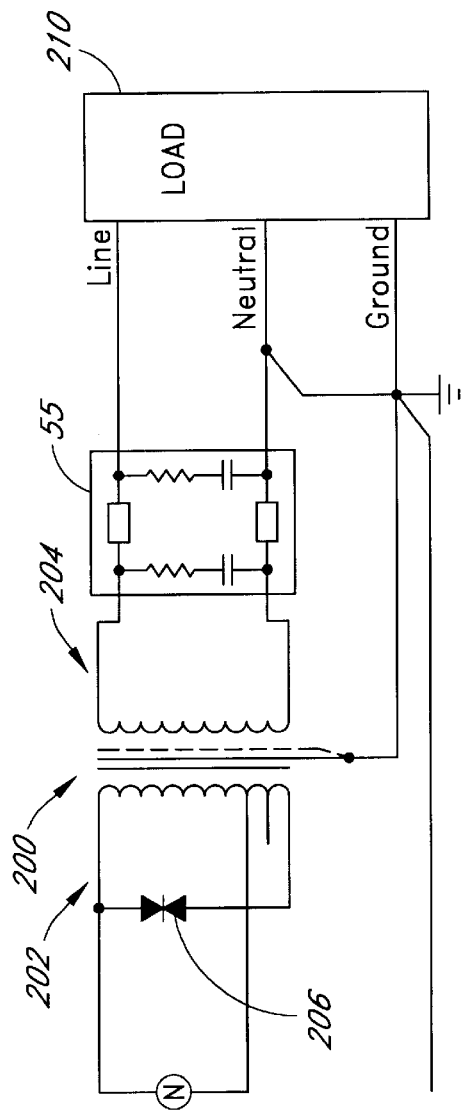
FIGS. 17A–17D depict examples of single-phase transformers employing the present invention.

FIG. 17A depicts a single-phase transformer 200 incorporating both the suppressor and filter features of the present invention. The transformer 200 has a primary 202, a secondary 204, a suppressor element 206 and the filter 55. FIG. 17A also depicts a load 210 coupled to the output of the filter 55. As discussed above, additional output filter can be cascaded to add additional protection. The suppressor element 206 and the filter 55 are of any types described above.

Figure 17B:
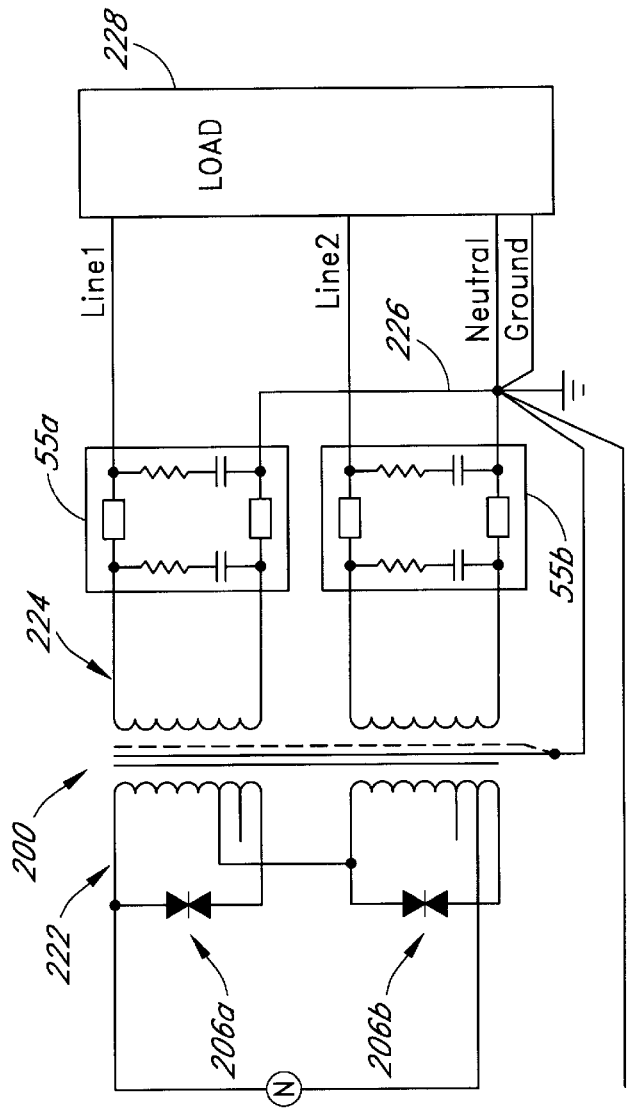
Figure 17C:
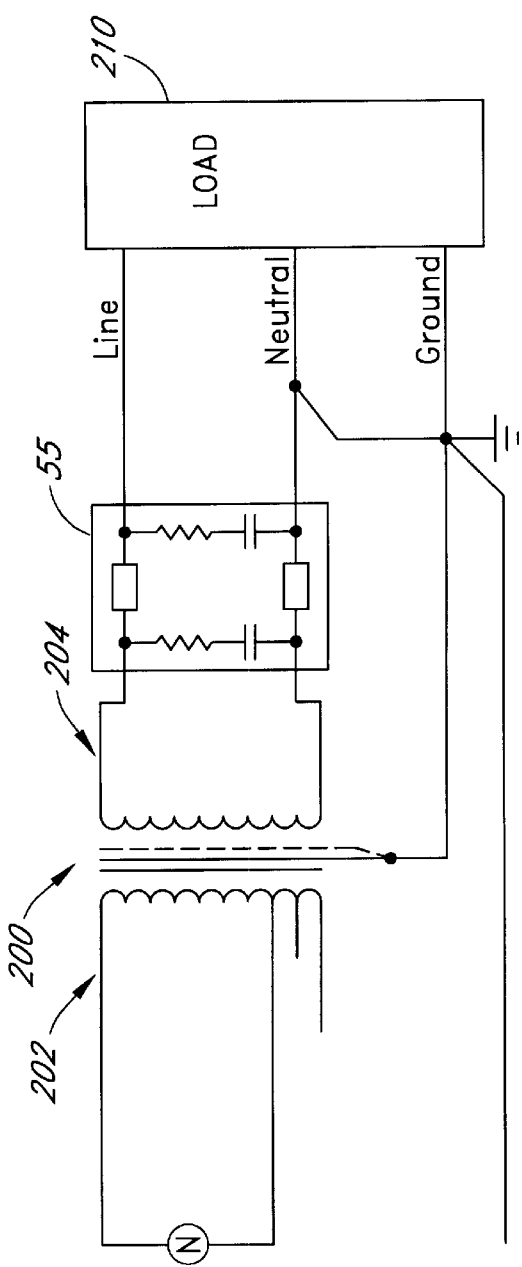
Figure 17D:
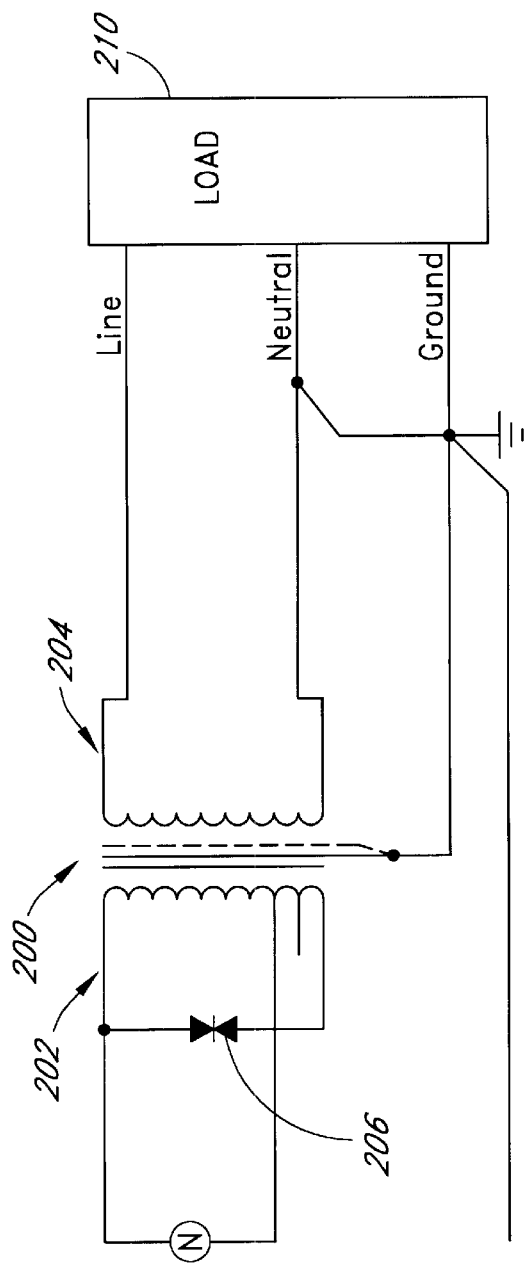

FIG. 17B similarly depicts a single phase transformer 220 having a primary 222 and a secondary 224. The primary and secondary each have first and second coils connected in a conventional fashion. However, as with previous embodiments in a three-phase transformer, the coils each have a suppressor element 206a, 206b coupled across the start and finish of each of the coils, regardless of whether the source is coupled to a tap of the transformer. As in FIG. 17A, the secondary coils each has a filter element 55a, 55b coupled to each coil at its output start and finish leads with the common neutral 226 connected at the output of the filters 55a, 55b, similar to FIG. 17A. FIG. 17B also depicts a load 228. The various configurations illustrated for the three-phase transformers also apply to the single phase transformer. For example, transformers could be connected in parallel or series as described above, taps could be changed, filters could be cascaded, only suppressors or only filters could be provided. Accordingly, FIG. 17C depicts a single-phase transformer with no suppressor and FIG. 17D depicts a single phase transformer with no filter.

The invention can work equally well in a system with any number of phases.

While the present invention has been illustrated and described by means of a specific embodiment and additional features, numerous changes and modifications can be made to the embodiment and features shown without departing from the spirit and scope of the invention. The invention is defined by the claims and equivalents.

What is claimed is:

1. A transformer-based filtered power conditioning system, said system including a system ground or neutral, said system comprising:

a transformer having primary and secondary windings, said primary windings having input connections and said secondary windings having output connections;

input power lines connected to said primary winding input connections, said input power lines being adapted to be connected to a source of electrical power;

surge suppression elements connected across the ends of each said primary winding; and at least one filter circuit comprising at least two shunt legs, one of said at least two shunt legs forming an input shunt leg and one of said at least two shunt legs forming an output shunt leg, each shunt leg having a first connection and a second connection and having at least one capacitor between the first and second connections, and comprising a very low impedance element connected between the first connection of the input shunt leg and the first connection of the output shunt leg and a very low impedance element connected between the second connection of the input shunt leg and the second connection of the output shunt leg, wherein the first connection of said input shunt leg is connected to one polarity of said secondary windings;

the second connection of said input shunt leg is connected to the opposite polarity of said secondary windings;

the first connection of said output shunt leg is one polarity of the output of said power conditioning system and is adapted to be connected to a load; and the second connection of said output shunt leg is the opposite polarity of the output of said power conditioning system and is adapted to be connected to a load and connected to system neutral and ground.

2. The system recited in claim 1, wherein said shunt legs further comprise at least one resistor in series with said capacitor.

3. The system recited in claim 1, wherein said transformer is a single-phase transformer.

4. The system recited in claim 1, wherein said transformer is a three-phase transformer.

5. The system recited in claim 1, wherein said surge suppression elements are selected from the group consisting of metal oxide varistors (MOVs), silicon avalanche diodes (SADs), gas discharge tubes, and capacitor and inductor combinations, said combinations selectively including resistors.

6. The system recited in claim 1, wherein said surge suppression elements comprise metal oxide varistors (MOVs).

7. The system recited in claim 1, wherein said surge suppression elements comprise silicon avalanche diodes (SADs).

8. The system recited in claim 1, wherein said surge suppression elements comprise gas discharge tubes.

9. The system recited in claim 1, wherein said surge suppression elements comprise capacitor and inductor combinations.

10. The system recited in claim 1, wherein said capacitors in each shunt leg are substantially equal in capacitance.

11. The system recited in claim 1, wherein said capacitors in each shunt leg are unequal in capacitance.

12. The system recited in claim 1, wherein said filter circuit further comprises an inductor (L).

13. The system recited in claim 1, wherein said very low impedance element comprises an electrically conductive element to which said legs are mounted with the mountings being space apart on said electrically conductive element.

14. The system recited in claim 1, wherein said system is scalable by adding additional filter circuits to said secondary winding outputs.

15. The system recited in claim 2, and further comprising an anti-parallel diode arrangement connected across each said resistor in each shunt leg of said filter circuits.

16. The system recited in claim 1, wherein said power conditioning system is a three-phase system.

17. The system recited in claim 1, wherein said transformer has a primary and/or secondary wye configuration.

18. The system recited in claim 1, wherein said transformer has a primary and/or secondary delta configuration.

19. The system recited in claim 1, wherein said filter circuit is connected between said secondary windings and said output neutral.

20. The system recited in claim 18, wherein said connection to system ground is a phase-to-phase neutral bond.

21. The system recited in claim 1, wherein said shunt legs comprise a plurality of parallel R-C circuits.

22. The system recited in claim 19, wherein each said secondary winding has a start end and a finish end, said start end being connected to said load through said filter circuit and said finish end being connected to said system ground.

23. The system recited in claim 1, wherein the surge suppression elements are connected between the start and finish of each primary winding coil even though the input voltage is connected to a tap on the transformer.

24. A transformer based filtered power conditioning system, said system including a system ground or neutral, said system comprising:
   a transformer having primary and secondary windings, each primary winding having opposite ends and input connections, and each secondary winding having output connections;
   input power lines connected to said primary winding input connections, said input power lines being adapted to be connected to a source of electrical power; and
   surge suppression elements connected between opposite ends of each said primary winding, wherein the surge suppression elements are connected between the start and finish of each primary winding coil even though the input voltage is connected to a tap on the transformer.

25. The system recited in claim 24, wherein said surge suppression elements are selected from the group consisting of metal oxide varistors (MOVs), silicon avalanche diodes, gas discharge tubes, and capacitor and inductor combinations, said combinations selectively including resistors.

26. The system recited in claim 24, wherein said surge suppression elements comprise metal oxide varistors (MOVs).

27. The system recited in claim 24, wherein said surge suppression elements comprise silicon avalanche diodes (SADs).

28. The system recited in claim 24, wherein said surge suppression elements comprise gas discharge tubes.

29. The system recited in claim 24, wherein said surge suppression elements comprise capacitor and inductor combinations.

30. The system recited in claim 24, wherein said power conditioning system is a three-phase system.

31. The system recited in claim 24, wherein said transformer has a primary and/or secondary wye configuration.

32. The system recited in claim 24, wherein said transformer has a primary and/or secondary delta configuration.

33. The system recited in claim 24, wherein the transformer comprises a single-phase transformer.

34. The system recited in claim 24, wherein the transformer comprises a three-phase transformer.

35. A transformer-based filtered power conditioning system, said system including system ground or neutral, said system comprising:
   a transformer having primary and secondary windings, said primary windings having input connections and said secondary windings having output connections;
   input power lines connected to said primary winding input connections, said input power lines being adapted to be connected to a source of electrical power; and
   at least one filter circuit comprising at least two shunt legs, one of said at least two shunt legs forming an input shunt leg and one of said at least two shunt legs forming an output shunt leg, each shunt leg having a first connection and a second connection and having at least one capacitor between the first and second connections, and comprising a very low series impedance element connected between the first connection of said input shunt leg and said first connection of said output shunt leg, and having a very low series impedance element connected between the second connection of said input shunt leg and said second connection of said output shunt leg, wherein
   the first connection of said input shunt leg is connected to one polarity of said secondary windings;
   the second connection of said input shunt leg is connected to the opposite polarity of said secondary windings;
   the first connection of said output shunt leg is one polarity of the output of said power conditioning system and is adapted to be connected to a load; and
   the second connection of said output shunt leg is the opposite polarity of the output of said power conditioning system and is adapted to be connected to a load and to system neutral and ground.

36. The system recited in claim 35, wherein said capacitors in each shunt leg are substantially equal in capacitance.

37. The system recited in claim 35, wherein said capacitors in each shunt leg are unequal in capacitance.

38. The system recited in claim 35, wherein said filter circuit further comprises an inductor (L).

39. The system recited in claim 35, wherein said very low impedances comprise an electrically conductive element to which said legs are mounted with the mountings being spaced apart on said electrically conductive element.

40. The system recited in claim 35, wherein said system is scalable by adding additional filter circuits to said secondary winding outputs.

41. The system recited in claim 35, wherein said filter circuit further comprises at least one resistor in each shunt leg.

42. The system recited in claim 35, wherein said filter circuit is connected between said secondary windings and said system ground.

43. The system recited in claim 42, wherein said connection to system ground is a phase-to-phase neutral bond.

44. The system recited in claim 42, wherein each said secondary winding has a start end and finish end, said start end being connected to said load through said filter circuit and said finish end being connected directly to said system ground.

45. The system recited in claim 35, wherein said power conditioning system is a three-phase system.

46. The system recited in claim 35, wherein said transformer has a primary and/or secondary wye configuration.

47. The system recited in claim 35, wherein said transformer has a primary and/or secondary delta configuration.

48. The system recited in claim 41, further comprising an anti-parallel diode arrangement connected across said at least one resistor in each shunt leg.

49. The system recited in claim 35, comprising additional shunt legs between the input and output shunt legs to form cascaded filter circuits.

50. The system recited in claim 1, comprising additional shunt legs between the input and output shunt legs to form cascaded filter circuits.

* * * * *